United States Patent [19]
Stripling

[11] 3,877,317
[45] Apr. 15, 1975

[54] DYNAMIC GAS-LIQUID GYROSCOPE BEARING

[75] Inventor: William W. Stripling, Huntsville, Ala.

[73] Assignee: The United States of America as represented by the Secretary of the Army, Washington, D.C.

[22] Filed: Jan. 4, 1974

[21] Appl. No.: 430,962

[52] U.S. Cl. .................................. 74/5.6 A; 74/5.7
[51] Int. Cl. ...................... G01c 19/12; G01c 19/28
[58] Field of Search ............ 244/1 SA; 74/5.12, 5.7, 74/5.6 A; 308/9, DIG. 1

[56] References Cited
UNITED STATES PATENTS

| | | | |
|---|---|---|---|
| 2,964,953 | 12/1960 | Conley et al. | 74/5.7 |
| 3,187,588 | 6/1965 | Parker | 74/5.7 |
| 3,604,277 | 9/1971 | Stripling et al. | 74/5.7 X |
| 3,610,053 | 10/1971 | Stripling et al. | 308/DIG. 1 |
| 3,726,572 | 4/1973 | Beardmore | 308/9 |

Primary Examiner—Manuel A. Antonakas
Attorney, Agent, or Firm—Robert P. Gibson; Nathan Edelberg

[57] ABSTRACT

A transportation machine disposed for high (100+)g accelerations is provided with a steering mechanism and a hydromatic air bearing gyroscope having a rotor disposed to control pickoffs for operation of the steering mechanism to return the transportation machine to axial coincidence with the rotor responsive to outside forces. A supply of liquid is provided for augmentation of the air bearing to increase the load carrying capacity thereof responsive to the high accelerations.

2 Claims, 2 Drawing Figures

DYNAMIC GAS-LIQUID GYROSCOPE BEARING

BACKGROUND OF THE INVENTION

The stator of a spherical bearing is provided with meridian surface grooves for pumping action to increase the pressure between the stator and the rotor of the bearing and provide a fluid cushion therebetween. Compressed air has limited load carrying capacity and therefore such bearings with this medium are not candidates for high g(100+) missile operation. The bearing might be augmented with air of higher pressure to support the high g acceleration, but the cost and added weight of production or storage thereof particularly in small missiles would be prohibitive.

SUMMARY OF THE INVENTION

A gyroscope for directing a transportation machine in the linear portion of a path is provided with a stator and a rotor with grooves in the stator surface to provide a cushion of highly compressed air therebetween. A reservoir for a liquid is secured in the stator and passages therein communicate between the reservoir and the grooves with a restrictive device such as a membrane included to seal the liquid in the reservoir. The membrane is disposed to burst due to pressure of the liquid when acceleration of the transportation machine exceeds a predetermined value such as 100g to provide a liquid cushion for the rotor. The liquid is incompressible and since the linear flight of the missile is brief (substantially six seconds) a relatively small quantity of the liquid is required for operation at any acceleration likely to be encountered.

DESCRIPTION OF THE PREFERRED EMBODIMENT

Figure 1:
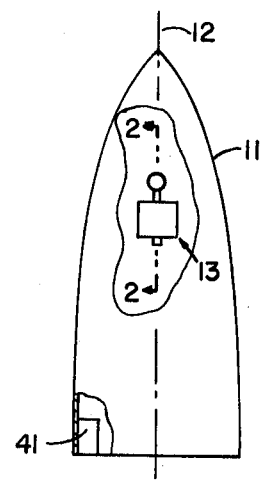
FIG. 1 shows a missile partly cutaway and the location of its gyroscope.
Figure 2:
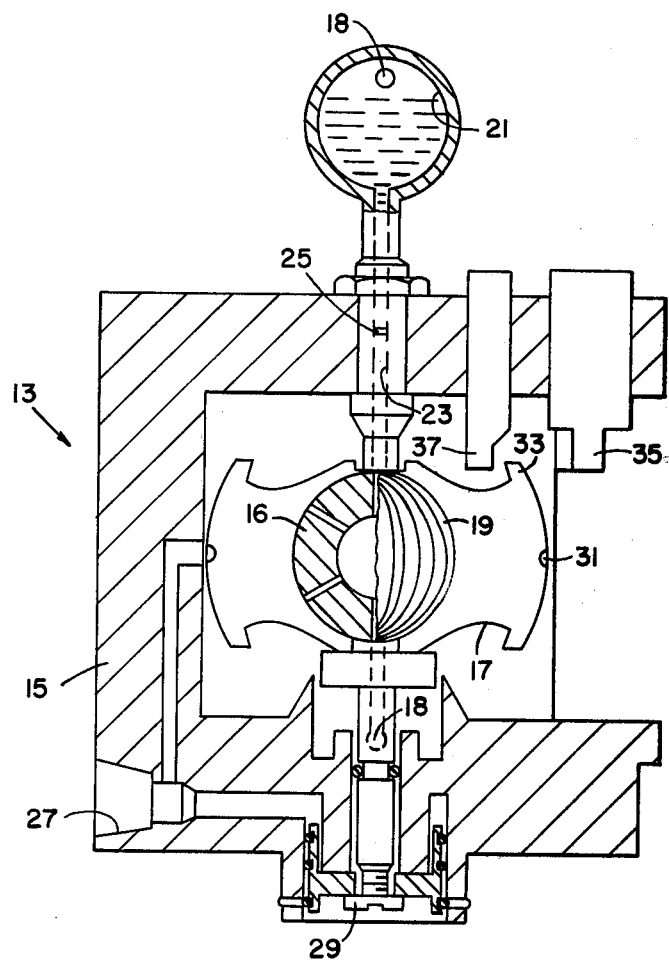
FIG. 2 is a view along line 2—2 of FIG. 1.

A transportation machine such as missile 11 with an axis 12 includes a gyroscope 13 with a stator 15 disposed in coaxial relation with missile 11 and provided with a center 16. Center 16 is spherically mated with a rotor 17 supplied with compressed air from sources 18 and provided with meridian grooves 19 to develope an equatorially increasing air compression between stator 15 and rotor 17. A reservoir 21 for a liquid such as freon, having a frictional characteristic comparable to compressed air is secured to stator 15 and a passage 23 in stator 15 communicates between reservoir 21 and grooves 19. A retention device such as membrane 25 or similar device is disposed to seal the fluid in reservoir 21 and to rupture when missile 11 is accelerated above a predetermined value (such as 100g) for the liquid to replace the air and provide an incompressible liquid cushion between stator 15 and rotor 17 during the period of high missile acceleration.

In operation of missile 11 with axis 12 and rotor 17 axis directed in the line of flight, air from passages 27 operates caging device 29 to free rotor 17. At the same time the air impinges on buckets 31 to rotate rotor 17 up to operating speed after which air in passages 27 is cut off to permit rotor 17 to coast during the remainder of the flight. Rotor 17 is provided with a projecting portion 33 to control the light from quadrature sources 35 that impinges on corresponding optical pickoffs 37. A predetermined area of pickoffs 37 is illuminated when stator 15 and rotor 17 are axially coincident and as the illuminated area changes when missile 11 rotates about center 16 due to outside forces, signals from pickoffs 37 operate a steering mechanism with jets 41 corresponding to pickoffs 37 to return missile axis 12 to coincidence with the rotor axis.

I claim:

1. A transportation machine disposed for operation with initial high acceleration in the linear portion of a path, comprising:

a gyroscope having a stator with a spherical center portion disposed in axial relation with said transportation machine and provided with surface grooves; a rotor in spherical bearing relation with said center portion and a supply of highly compressed air communicating into said surface grooves to provide a cushion of the highly compressed air between said stator and rotor; and a reservoir with fluid therein and a device secured to said stator for retention of said fluid in said reservoir;

said stator including passages communicating between said reservoir and said surface grooves, and said retention device disposed to permit flow of said fluid to said surface grooves responsive to the high acceleration.

2. A transportation machine as in claim 1 with said stator and rotor provided with axes, a pickoff and a light source for illumination thereof disposed on said stator and with said rotor disposed for projection between said light source and said pickoff for illumination of a predetermined area thereof responsive to coincidence of said axes; and steering means in communication with said pickoff disposed on said transportation machine for rotation thereof and retention of said axes in coincidence responsive to variations in said illumination area.

* * * * *